United States Patent
Chiang

(10) Patent No.: US 8,057,212 B2
(45) Date of Patent: Nov. 15, 2011

(54) FORMING MACHINE THAT QUICKLY COMPACTS HOLLOW MATERIALS AND AUTOMATICALLY RECYCLES THE MATERIALS

(76) Inventor: Wen-Di Chiang, Taipei Hsien (TW)

( * ) Notice: Subject to any disclaimer, the term of this patent is extended or adjusted under 35 U.S.C. 154(b) by 0 days.

(21) Appl. No.: 12/189,177

(22) Filed: Aug. 10, 2008

(65) Prior Publication Data
US 2011/0229592 A1 Sep. 22, 2011

(51) Int. Cl.
*A21C 11/12* (2006.01)
*A21C 11/14* (2006.01)

(52) U.S. Cl. ........ 425/217; 425/254; 425/259; 425/281; 425/298; 425/436 R; 426/514; 426/518

(58) Field of Classification Search .................. 425/215, 425/217, 253, 254, 256, 259, 260, 261, 281, 425/282, 286, 287, 288, 298, 436 R, 436 RM, 425/579, 581, 583; 426/512, 514, 518
See application file for complete search history.

(56) References Cited

U.S. PATENT DOCUMENTS

| | | | | | |
|---|---|---|---|---|---|
| 4,036,575 | A | * | 7/1977 | Prince | 425/204 |
| 4,061,453 | A | * | 12/1977 | DeSantis | 425/78 |
| 4,075,359 | A | * | 2/1978 | Thulin | 426/502 |
| 4,158,537 | A | * | 6/1979 | Cuff et al. | 425/260 |
| 4,233,016 | A | * | 11/1980 | Chin et al. | 425/288 |
| 5,154,211 | A | * | 10/1992 | Daleiden et al. | 141/131 |
| 5,304,050 | A | * | 4/1994 | Vismara | 425/215 |
| 5,861,185 | A | * | 1/1999 | Capodieci | 426/518 |

* cited by examiner

*Primary Examiner* — Richard Crispino
*Assistant Examiner* — Thukhanh Nguyen
(74) *Attorney, Agent, or Firm* — Muncy, Geissler, Olds & Lowe, PLLC

(57) ABSTRACT

A forming machine that quickly compacts hollow materials and automatically recycles the materials includes molds, each of which is provided with a feeder having a hollow hole. An opening of the feeder is exactly located at a hollow position of a food product to be formed, and an upper end of the hollow feeder is connected with recycling tubes coming from a feed tank. When a cope and a nowel compact and form the materials into the hollow food products, the feeders will automatically push upward remainders at hollow places of the food products that are stacked constantly, enabling the remainders to enter into the feed tank along the recycling tubes, so as to achieve effects of quickly compacting and processing the materials and automatically recycling the remainders.

2 Claims, 9 Drawing Sheets

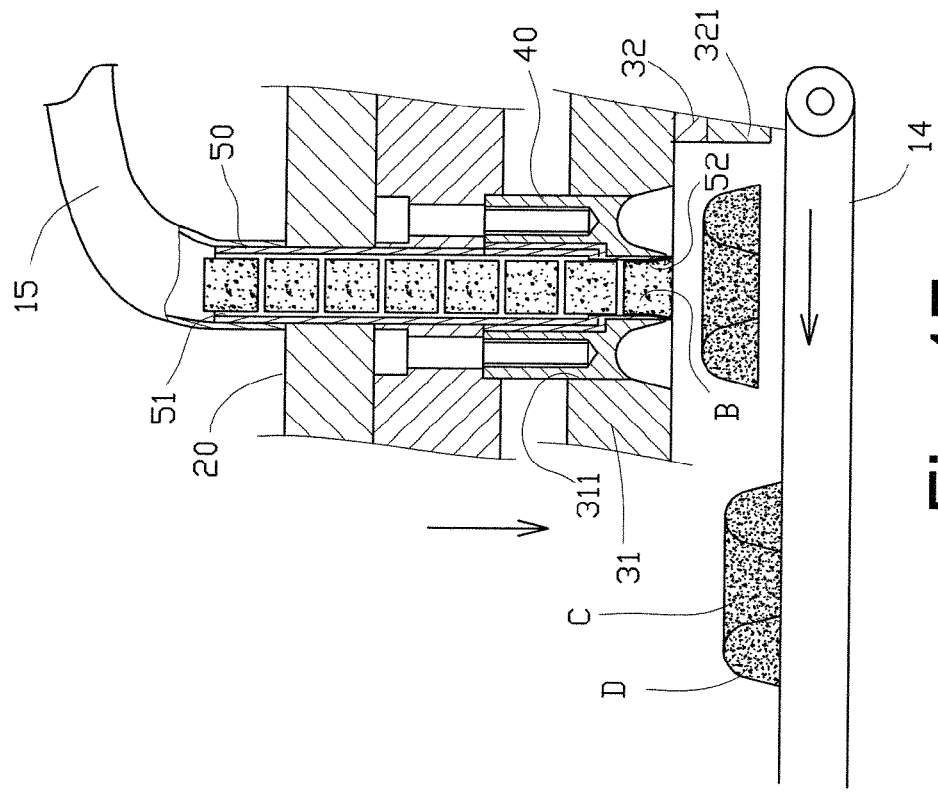
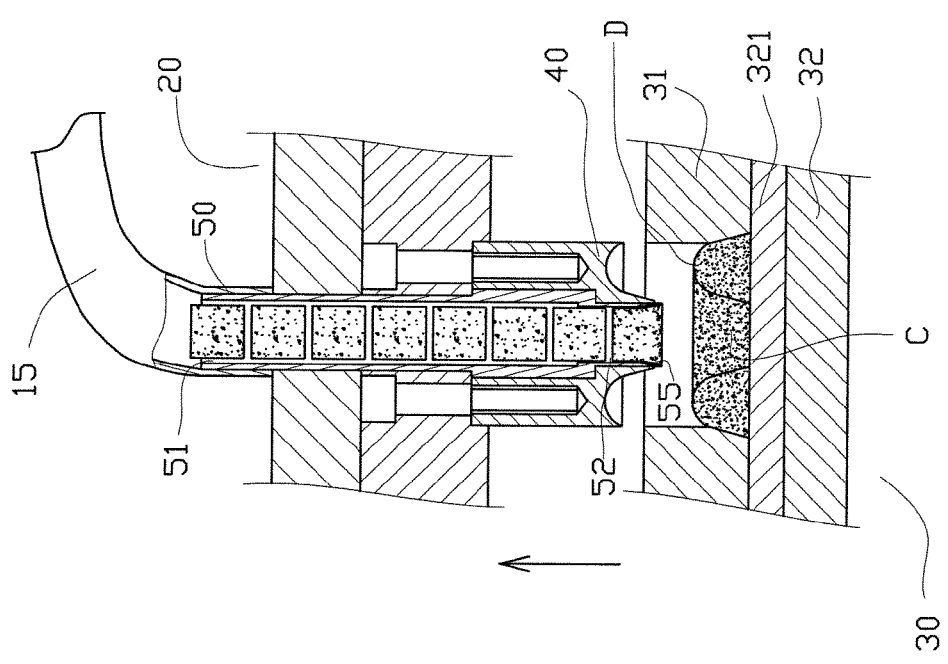

FORMING MACHINE THAT QUICKLY COMPACTS HOLLOW MATERIALS AND AUTOMATICALLY RECYCLES THE MATERIALS

BACKGROUND OF THE INVENTION a) Field of the Invention

The present invention relates to a forming machine, and more particularly to a forming machine by which a conventional processing method for compacting food products is improved, with a design that hollow food products can be compacted quickly and automatically, and remainders from processing the hollow food products can be recycled, so as to achieve effects of time saving and economy.

b) Description of the Prior Art

Among all kinds of food products, development has been gradually toward a so-called health food that can be eaten immediately and is a functional green food. The health food is made by many kinds of grains mixed with a little of syrup, is well known for having balanced nutrition, and can be manufactured into cereal bars, chocolate grains and soup cubes containing all kinds of various grains, with a variety of shapes such as a strip, a heart, a cylinder or a doughnut with a hole; these shapes are all designed to cater for a consumer's preference. In making these foods, a special container had to be used to load the foods which are then poured out for processing after being cooled down. As a manufacturing process is complicated and a lot of labor works need to be used, time and labor will be wasted, and cost can be high.

Accordingly, improvement has been pursued by each nation constantly. However, the containers are all complicated structures and have large sizes; therefore, satisfaction is not achieved. An automatic quick compacting forming machine has emerged in existing markets of Taiwan, with a feature that no conventional special container is needed to form quickly. After being formed, the food products are transported by a conveyor belt to a cooling system for cooling and setting, and then can be packaged. Or, depending on a demand of manufacturing process, the materials that are formed automatically can be transported by the conveyor belt to ovens for baking, and then are packaged after cooling. As this kind of manufacturing process is actually provided with effects of time and labor saving, automation and fast speed, the processing method to compact multi-grain products in food industries can be improved effectively, which indeed benefits a lot.

However, as this forming machine is only aimed to compact the solid materials, the processing operation cannot be provided to the granular health cereal bars or other related food products with holes, which is really imperfect.

SUMMARY OF THE INVENTION

The primary object of the present invention is to provide a forming machine that quickly compacts hollow materials and automatically recycles the materials, which provides for an automatic and quick processing of filling, compacting and returning for materials, and is also provided with functions of processing hollow food products and automatically recycling remainders.

For the forming machine that quickly compacts hollow materials and automatically recycles the materials, according to the present invention, each mold is provided with a hollow feeder which is connected at a hole place of a forming end where food products are formed, such that each time when conducting a compaction processing, surplus materials at the hole places will be stacked upward continuously and entered into a feed tank for recycling from recycling tubes through feed parts.

For the forming machine that quickly compacts hollow materials and automatically recycles the materials, according to the present invention, operations of automatically supplying materials to a cope and a nowel for compacting and returning are divided into mixing in the feed tank, supplying and scraping, compacting, decompacting, driving and restoring, so as to achieve effects of automatically and quickly compacting and returning the materials.

For the forming machine that quickly compacts hollow materials and automatically recycles the materials, according to the present invention, a substratum is fixed with a Teflon plate, such that a cut-off action to the hollow materials by knife-edges can be actually and effectively provided, and a jamming condition resulted from friction when a feed plate moves in and out can be prevented, thus having a lubrication effect.

To enable a further understanding of the said objectives and the technological methods of the invention herein, the brief description of the drawings below is provided below followed by the detailed description of the preferred embodiments.

BRIEF DESCRIPTION OF THE DRAWINGS

FIG. 16 shows a schematic view of a decompaction operation according to the present invention.

FIG. 17 shows a schematic view of a driving process according to the present invention.

DETAILED DESCRIPTION OF THE PREFERRED EMBODIMENTS

Figure 1:
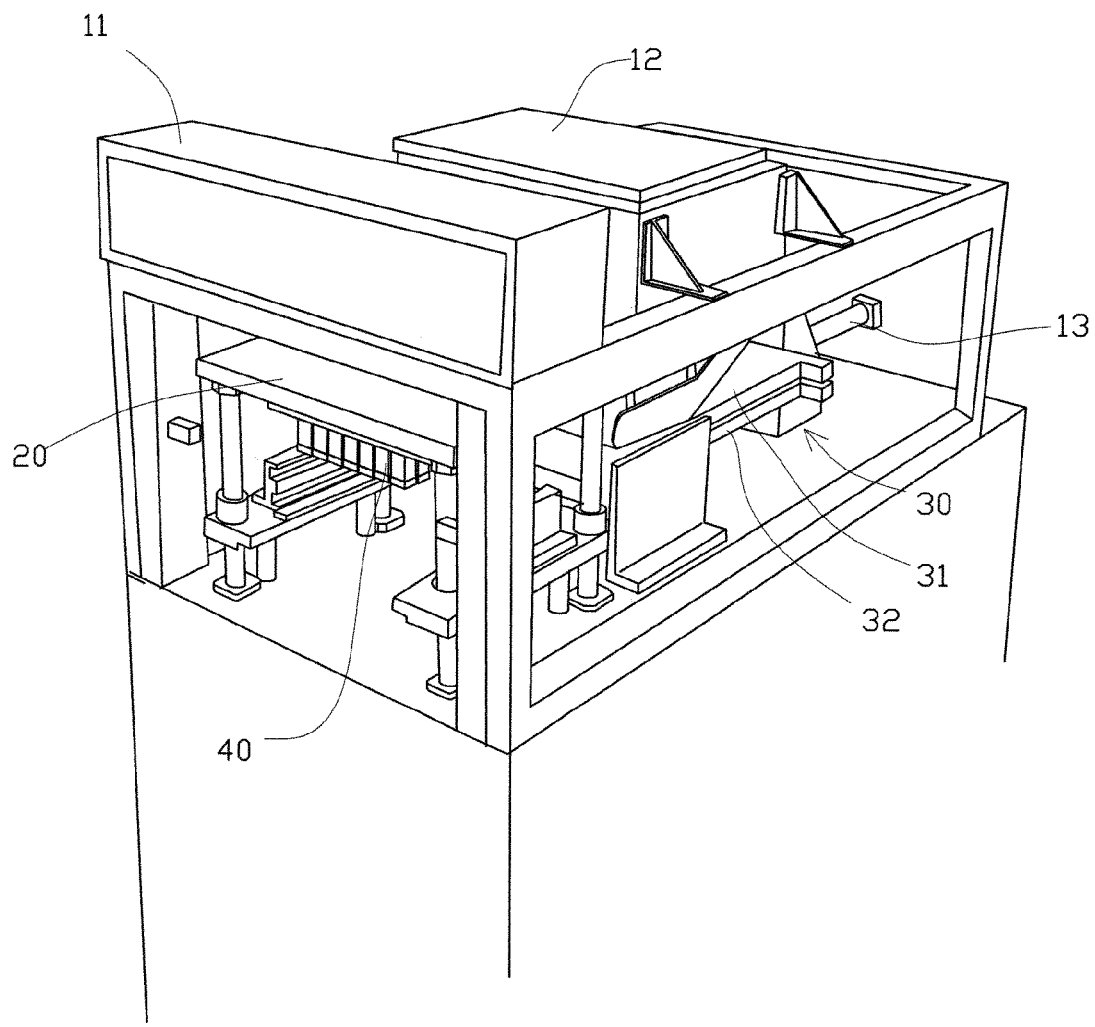
FIG. 1 shows a schematic view of an embodiment of a forming machine according to the present invention.
Figure 2:
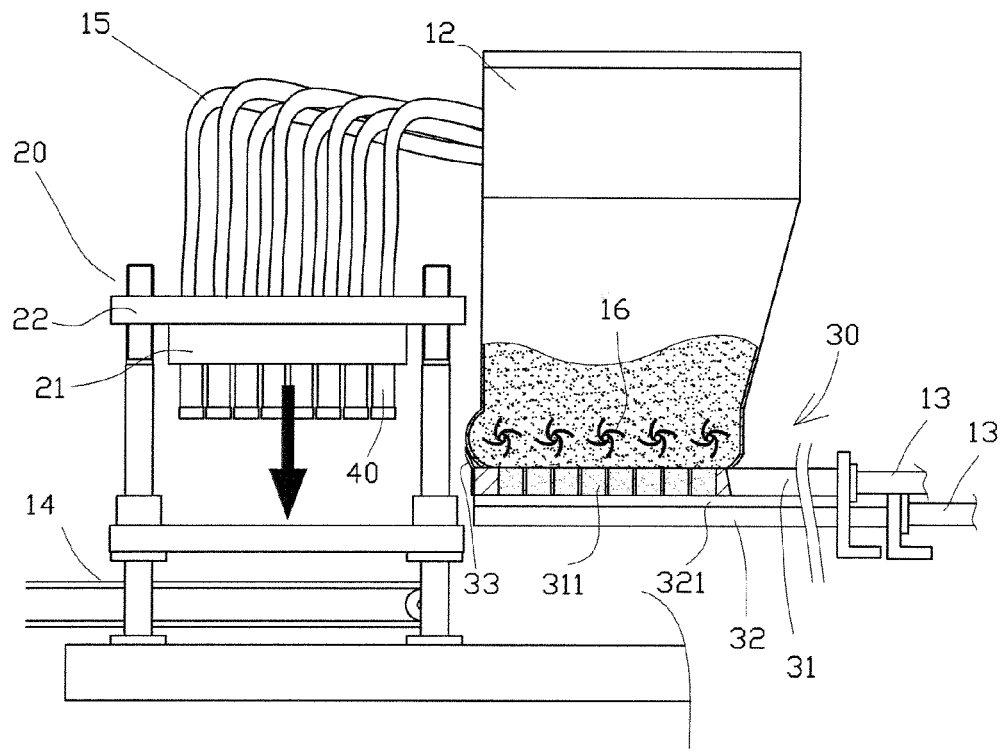
FIG. 2 shows a simple side view of a forming machine according to the present invention.

Referring to FIG. 1 and FIG. 2, it shows a three-dimensional view and a plan view of basic structures and operations of a forming machine that quickly compacts hollow materials and automatically recycles the materials, according to the present invention and being same as aforementioned the automatic quick compacting forming machine that has been emerged in public. A table is basically provided with a control box 11, a feed tank 12 that is provided with functions of heat preservation, mixing and dropping materials, two sets of driving pistons 13, a cope 20, molds 40, and a nowel 30 that includes a feed plate 31 and a substratum 32, wherein an interior of the feed tank 12 is provided with mixers 16 that mix by rotating constantly to press materials into the nowel 30; the two driving pistons 13 are used to control a forward and backward movement of the feed plate 31 and the substratum 32; and a lower end of the cope 20 is provided with a conveyor 14.

Referring to FIG. 2, the cope 20 includes a fixing seat 22 and a mold base 21, under the mold base 21 is provided with the plural molds 40 for compacting and forming the materials; whereas, the present invention is characterized by that above the molds 40 are provided with recycling tubes 15 that are connected with the feed tank 12 to recycle remainders of hollow parts in the feed tank 12 for re-use, after the hollow materials have been compacted by the molds 40 (the function improvement and structures will be described later).

Referring to FIG. 2, the nowel 30 includes the feed plate 31 and the substratum 32, wherein a front side of the feed plate 31 is provided with a plurality of die holes 311, and a front end of the feed plate 31 is provided with a scraper 33. The substratum 32 is provided with a Teflon device 321 which can be a Teflon plate to serve as an underlay when knife-edges in the molds 40 are cutting off the hollow materials, and to reduce friction between the hollow materials and the feed plate 31.

Figure 3:
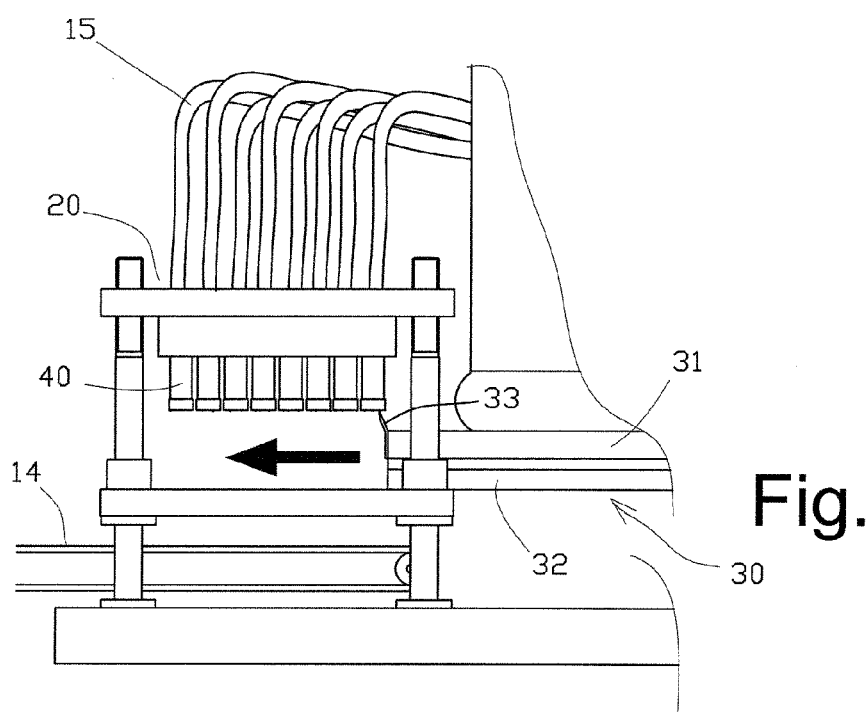
FIG. 3 shows a schematic view of an implementation of scraping for a forming machine according to the present invention.
Figure 4:
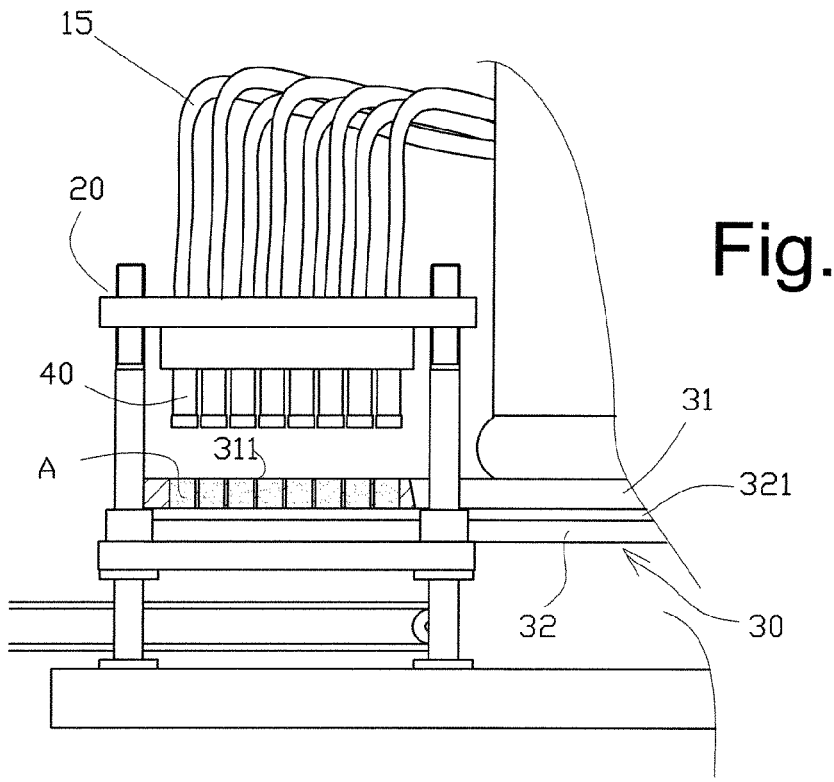
FIG. 4 shows a schematic view of a feed process for a forming machine according to the present invention.

After the materials have been filled into the die holes 311 of the feed plate 31 through the mixers 16 from the feed tank 12, the cope 20 will start to descend to a first position of stand-by. As shown in FIG. 3, the nowel 30 will move forward the feed plate 31 and the substratum 32, and at this time, the scraper 33 at the front end of the feed plate 31 is exactly located below the molds 40 to proceed with the scraping procedure to scrape out the stained materials from a previous operation, followed by moving forward to be positioned as shown in FIG. 4.

Figure 5:
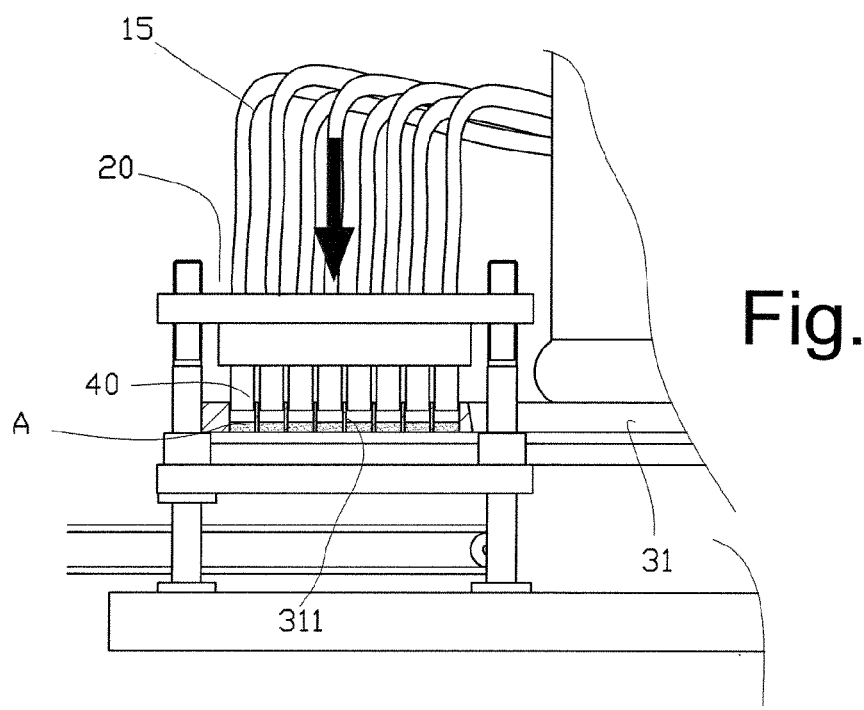
FIG. 5 shows a schematic view of a compaction process for a forming machine according to the present invention.
Figure 6:
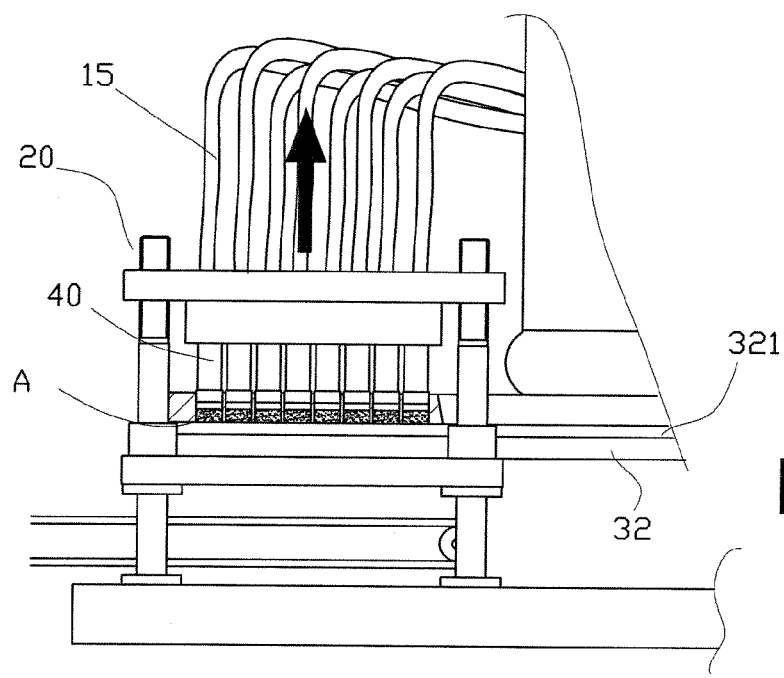
FIG. 6 shows a schematic view of a decompaction process for a forming machine according to the present invention.
Figure 7:
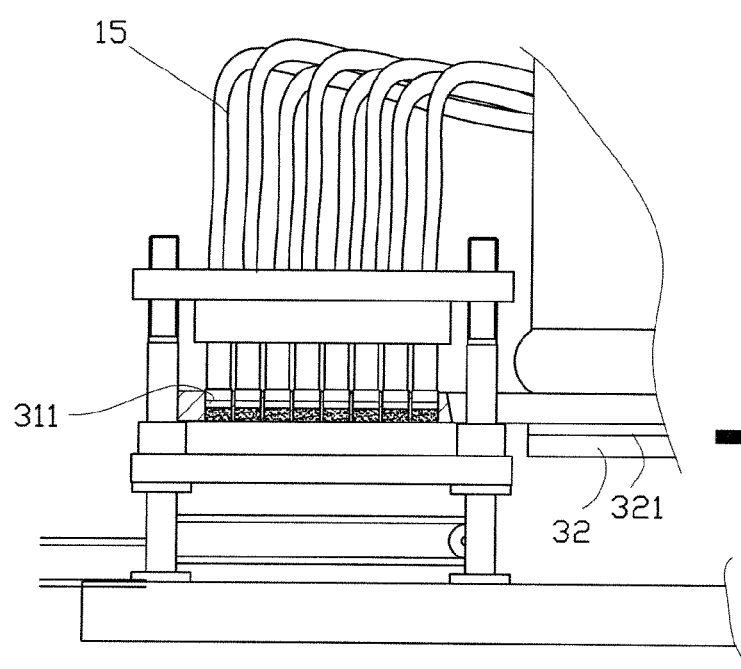
FIG. 7 shows a schematic view of a movement of a substratum for a forming machine according to the present invention.

Referring to FIG. 5, at this time, the cope 20 will continue to descend to a second position where the molds 40 enter into the die holes 311 to compact the materials A. Due to that ingredients of the materials A to be compacted are different; the cope 20 will be inching by a small distance at a third position of decompaction, after compacting according to configured time, as shown in FIG. 6. Therefore, some gap will be left between the molds 40 and the compacted materials A to release a compression state between the materials A and the substratum 32 that the substratum 32 can be returned smoothly. As shown in FIG. 7, the Teflon device 321 on the substratum 32 will move too.

Figure 8:
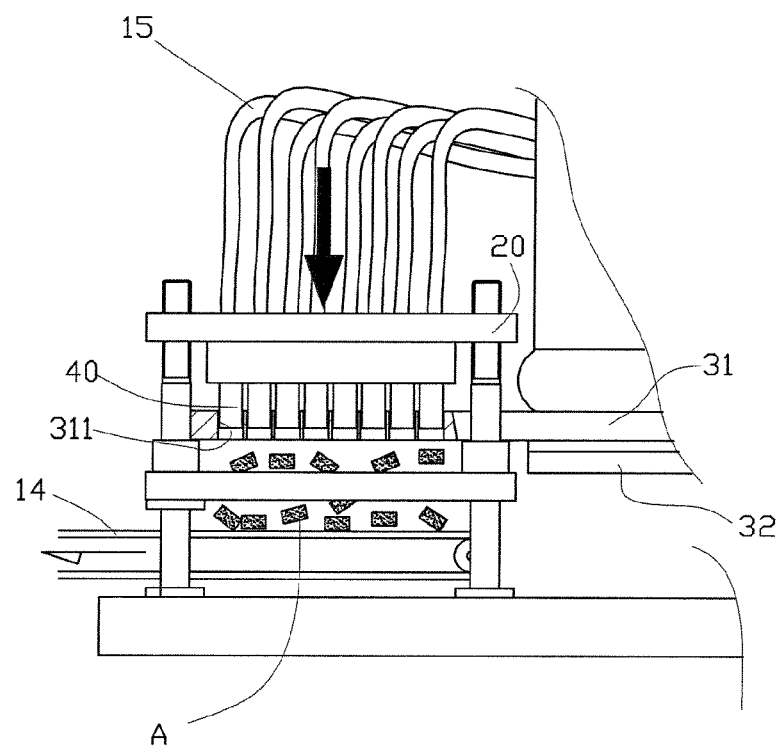
FIG. 8 shows a schematic view of a returning operation for a forming machine according to the present invention.
Figure 9:
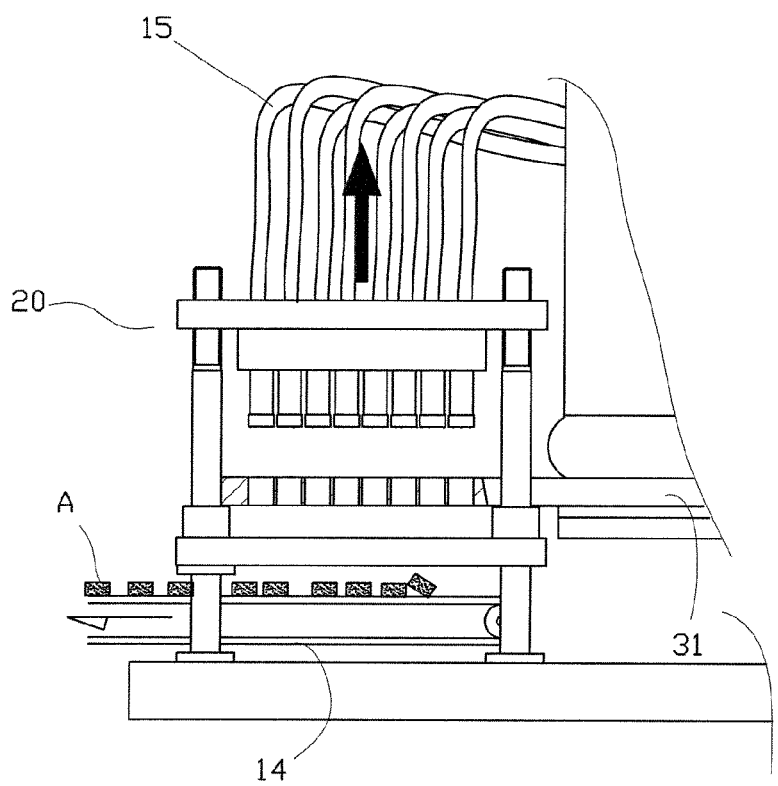
FIG. 9 shows a schematic view of a restoring operation for molds of a forming machine according to the present invention.
Figure 10:
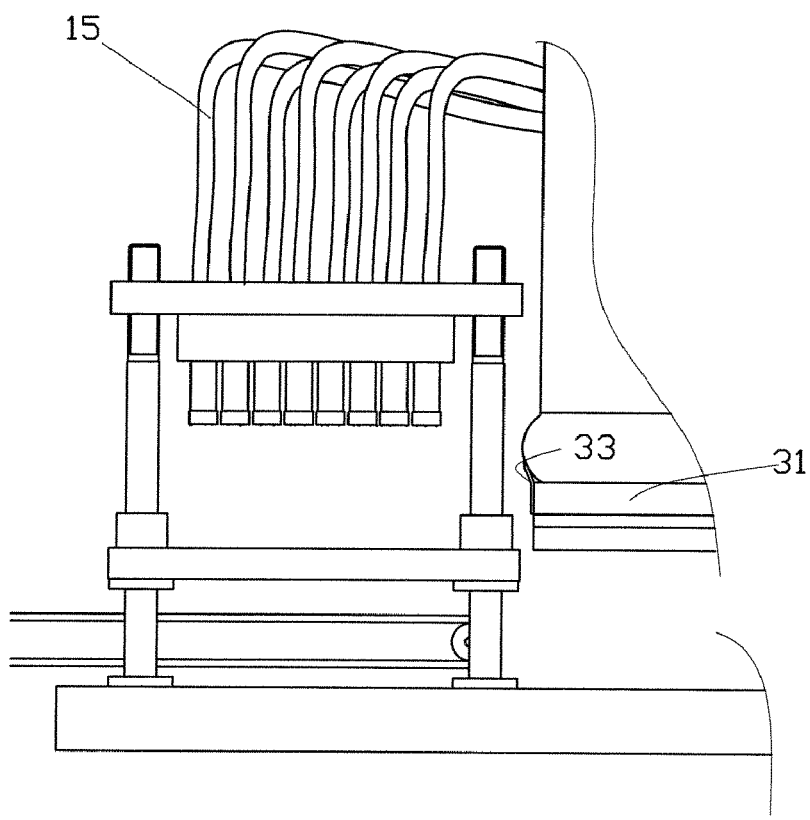
FIG. 10 shows a schematic view of a feed plate of a forming machine, while waiting for materials according to the present invention.

Referring to FIG. 8, after the substratum 32 has been returned, lower sides of the die holes 311 are opened. At this time, the cope 20 will descend to a fourth position of driving to push the materials A out of the die holes 311, allowing the materials A to be dropped on the conveyor 14 for transporting. Next, the cope 20 will move upward to restore to the first position of stand-by, as shown in FIG. 9. Following that, the feed plate 31 will be returned to a position for awaiting the materials, as shown in FIG. 10. After the materials have been loaded by the feed plate 31, the process of scraping, compacting, decompacting, driving and standing-by is initiated again.

Figure 11:
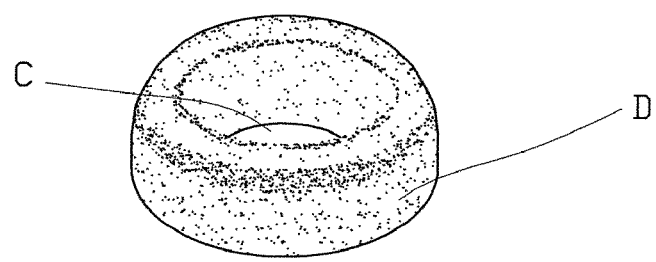
FIG. 11 shows a schematic view of a food having a hollow part according to the present invention.
Figures 12, 13:
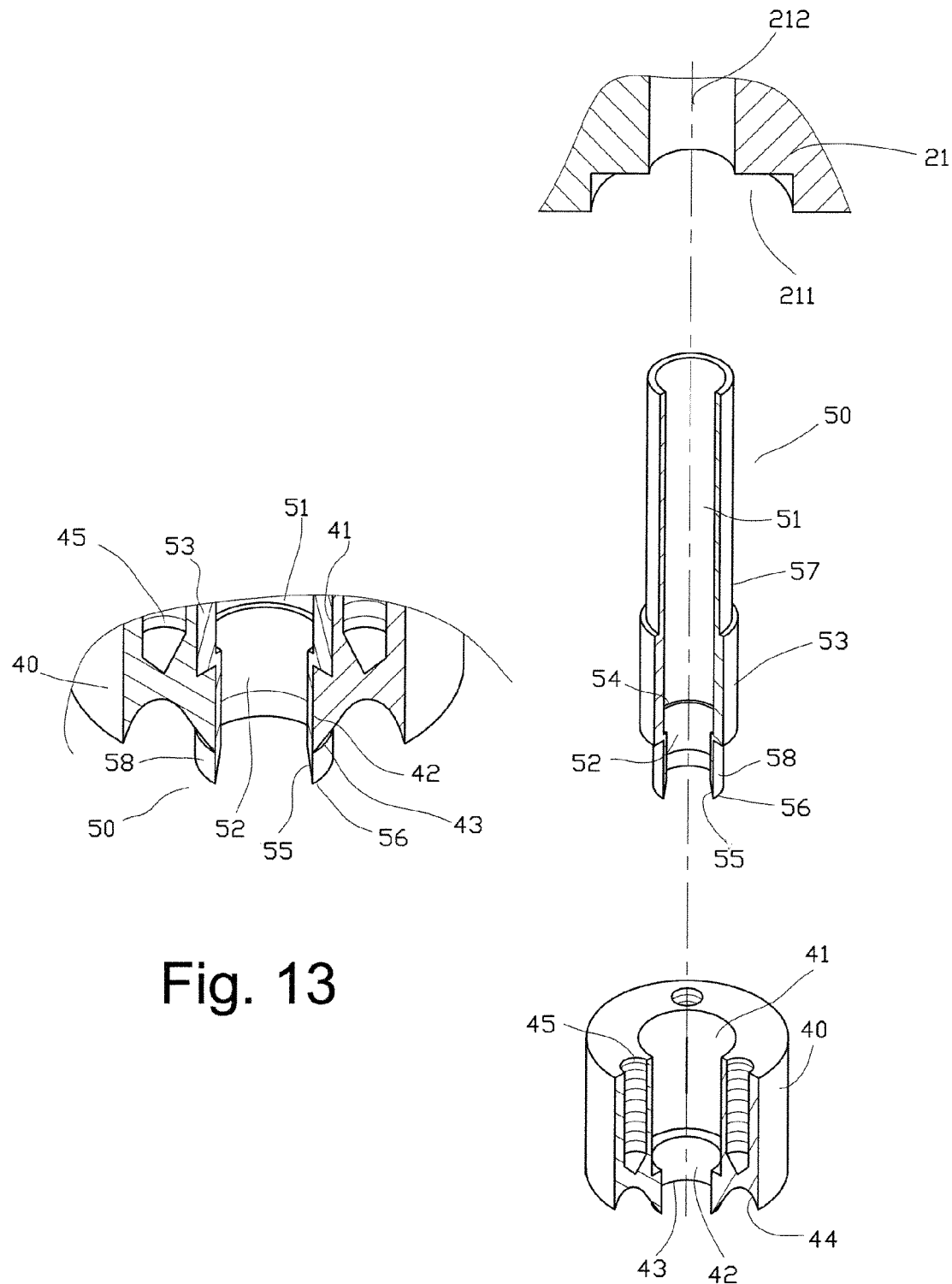
FIG. 12 shows a three-dimensional view of a mold and a feeder according to the present invention.
FIG. 13 shows a schematic view of a position of a lower part of the feeder in FIG. 12 at the mold according to the present invention.

For the compaction to a product D with a hollow part C, such as a doughnut as shown in FIG. 11, the present invention is characterized by a design which can effectively and easily solve the problem of automatically recycling a remainder from processing the hollow part C. Referring to FIG. 12, the mold 40 is made by processing Teflon and therefore is provided with an anti-stick function to prevent the mold 40 from being stained by the materials, thereby affecting a quality of processing. An interior of the mold 40 can be placed with a feeder 50 made by a stainless steel tube. The mold 40 is provided with a first hole 41 and a second hole 42, the first hole 41 is larger than the second hole 42, and a lower end of the mold 40 is a forming part 44. In this embodiment, an exterior opening 43 of the second hole 42 is protruded out of the forming part 44, and the feeder 50 is also provided with a first hole 51 and a second hole 52, with the second hole 52 being located at a lower end and smaller than the first hole 51 at an upper end, a lower opening of the second hole 52 being shaped as an inner tapered cone 55 to form a knife-edge 56, and an inner opening 54 being extended above the second hole 52 to be connected with the first hole 51. On the other hand, an exterior part close to a lower end of the feeder 50 is formed with a larger aperture 53 to separate an exterior part of the feeder 50 into an upper part 57 and a lower part 58. This aperture 53 can enter into the first hole 41 of the mold 40, and the lower part 58 can enter into the second hole 42 of the mold 40, allowing the lower part 58 to be protruded out of the opening 43 of the second hole 42 (as shown in FIG. 13), to facilitate cutting off the remainder in the hollow part C of the product D by the knife-edge 56 of the inner tapered cone 55.

Figure 14:
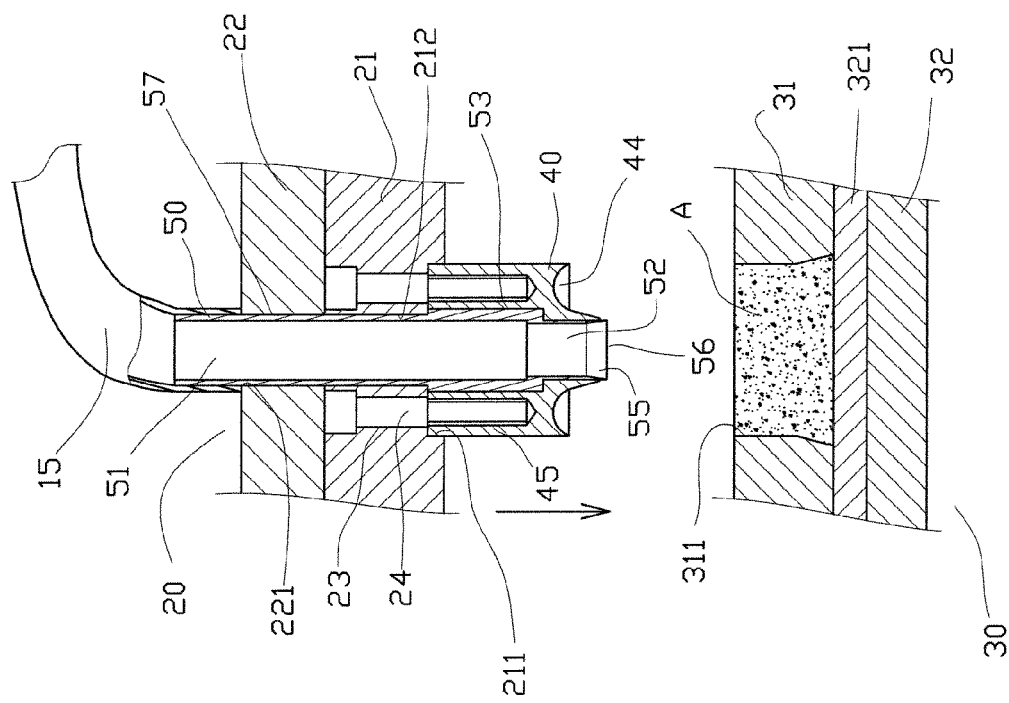
FIG. 14 shows a schematic view of a feed process according to the present invention.

A position of the mold base 21 relative to the mold 40 is provided with a larger first hole 211 for positioning in the mold 40, and a second hole 212 for transfixing the upper part 57 of the feeder 50. Referring to FIG. 12 and FIG. 14 simultaneously, the fixing seat 22 is also provided with a hole 221, allowing the upper part 57 to pass out; whereas, the mold 40 is provided with a plurality of screw-holes 45, allowing screws 24 to be screwed in from holes 23 of the mold base 21, so as to abut the mold 40 and the larger aperture 53 of the feeder 50 into the first hole 211 of the mold base 21, thereby enabling the upper part 57 of the feeder 50 to be transfixed into the second hole 212 of the mold base 21, and the hole 221 of the fixing seat 22, so as to be connected with the recycling tubes 15.

Figure 15:
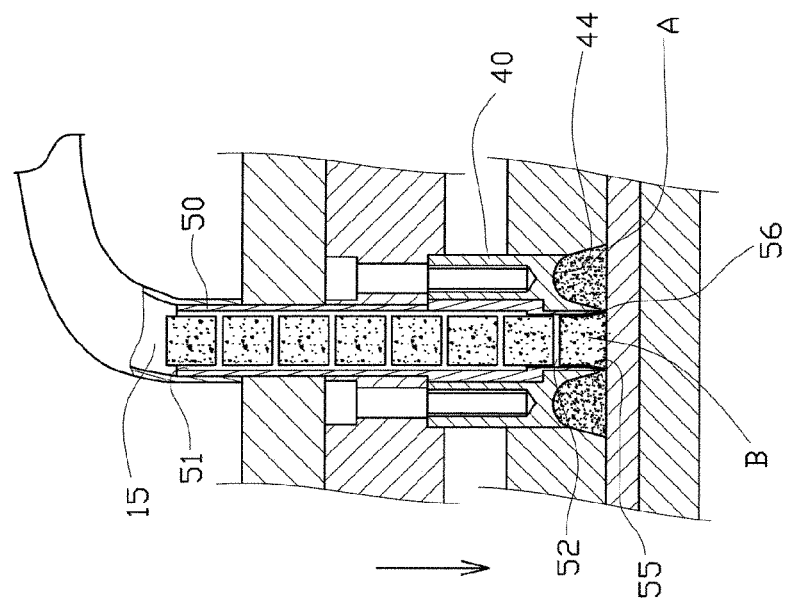
FIG. 15 shows a schematic view of a compaction process according to the present invention.

Referring to FIG. 14, in processing, when the feed plate 31 of the nowel 30 is filled with the materials and is then located at the processing position, the cope 20 will descend, allowing the molds 40 to enter into the die holes 311 for compressing the materials A to proceed with the compaction operation. As shown in FIG. 15, at this time, the materials A that are located at the forming part 44 will be compacted into products; whereas, the materials that are located at the hollow position of the feeder 50 will be cut off by the knife-edge 56 of the inner tapered cone 55, and thus, be separated with the compacted materials A to form remainders B. As the knife-edge 56 is in an inner tapered cone shape, the puffing remainder B will be guided into the second hole 52. In addition, due to that the second hole 52 is smaller than the inner tapered cone 55, the remainder B that is led into the second hole 52 through the inner tapered cone 55 will be fixed at that position as being clamped, until being pushed upward by a next remainder.

Next, the decompaction operation is performed where the cope 20 moves upward by a distance, enabling the product D and the Teflon device 321 of the nowel 30 to be in a puffing shape (as shown in FIG. 16). Following that, after the substratum 32 and the Teflon device 321 are restored, the driving operation is carried out (as shown in FIG. 17) where the cope 20 descends, allowing the mold 40 to enter into the die hole 311, such that the product D can be pushed out into the conveyor 14.

The remainder B from the first processing will be pushed upward constantly by the succeeding remainders B from processing, and enter into the feed tank 12 following the path of second hole 52, first hole 51, and recycling tubes 15 of the feeder 50, thereby achieving an object of being automatically transported to the feed tank 12 (as shown in FIG. 2) for recycling.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A forming machine that quickly compacts hollow materials and automatically recycles the materials, comprising a feed tank for mixing materials supplied for processing, a cope which is provided with molds and a mod base, and a nowel which includes a feed plate and a substratum, with the feed plate and the substratum being controlled by driving pistons to move respectively, a front end of the feed plate being provided with a scraper, a plate surface of the feed plate being provided with a plurality of die holes, and the substratum being provided with a Teflon plate which moves along with the substratum; in operating, after loading materials on the feed plate, the cope descending to a height of the scraper, and when the nowel moving forward, the scraper of the feed plate scraping out stained materials from a previous operation, at a lower surface of the mold; after the feed plate moving forward to a predetermined position of the die holes relative to the molds, the cope descending to allow the molds to enter into the die holes for compacting the materials; after compaction, the cope moving by a distance to release pressure to the materials, forming a small gap between the materials and the molds; at this time, the substratum being returned and the cope descending, allowing the molds to push and squeeze the compacted materials to escape from the die holes and to drop into predetermined positions; after that, the cope being restored to the height of scraper to proceed with the same processing procedure; the forming machine that quickly compacts hollow materials and automatically recycles the materials being provided with features that an interior of the mold is provided with a feeder, the mold is provided orderly from a top end downward with a first hole and a second hole, a bottom of the mold is a forming part, with the first hole being larger than the second hole, and a lower opening of the second hole being protruded out of the forming part; the feeder being also provided with a first hole and a second hole, the second hole being located at a lower end and smaller than the first hole at an upper end, the first hole being connected upward with recycling tubes, and a lower opening of the second hole being in an inner tapered cone shape to form a knife-edge; an outer shape of the feeder being formed with a larger aperture to separate the feeder into an upper part and a lower part, this larger aperture entering into the first hole of the mold, and the lower part being transfixed at the second hole of the mold, allowing the knife-edge to be protruded out of the forming part of the mold; herefore, when compacting the materials, the knife-edge of the feeder cutting off the materials of a hollow hole in a predetermined product, at a same time, to form a remainder which enters into the second hole; and under a continuous processing, the cut-off remainders entering into the feed tank for recycling through the recycling tubes following the feeder.

2. The forming machine that quickly compacts hollow materials and automatically recycles the materials, according to claim 1, wherein the mold base is provided with a larger first hole for positioning in the mold, and a second hole for transfixing an upper part of the feeder; the mold being provided with a plurality of screw-holes, allowing screws to be screwed in from holes of the mold base, so as to abut and fix the mold and the larger aperture of the feeder into the first hole of the mold base.

* * * * *